United States Patent [19]
Sillitto et al.

[11] Patent Number: 5,151,820
[45] Date of Patent: Sep. 29, 1992

[54] ZOOM LENS

[75] Inventors: Hilary G. Sillitto, West Lothian; Alison B. Lessels, Edinburgh, both of United Kingdom

[73] Assignee: GEC Ferranti Defence Systems Limited, Stanmore, United Kingdom

[21] Appl. No.: 694,298

[22] Filed: May 2, 1991

[30] Foreign Application Priority Data

May 18, 1990 [GB] United Kingdom ............... 9011160

[51] Int. Cl.5 .............................................. G02B 15/00
[52] U.S. Cl. ..................................... 359/354; 359/356; 359/357; 359/676; 359/679
[58] Field of Search ............... 359/353, 354, 355, 356, 359/357, 676, 679, 684, 691

[56] References Cited

U.S. PATENT DOCUMENTS 3,890,036  6/1975  Grey .................................... 359/684
4,148,548  4/1979  Thompson ......................... 359/354
4,494,819  1/1985  Lidwell .............................. 359/356

FOREIGN PATENT DOCUMENTS 1532096  11/1978  United Kingdom ............... 359/354

Primary Examiner—Bruce Y. Arnold
Assistant Examiner—J. P. Ryan
Attorney, Agent, or Firm—Spencer, Frank & Schneider

[57] ABSTRACT

A zoom lens, for use in a telescope at infra-red wavelengths or single wavelength visible light, provides a magnification which may be adjusted to either of two predetermined values. The lens comprises a pair (14) of similar elements (15, 16) fixed relative to one another and each having an aspheric convex surface with the aspheric surfaces of the pair of elements outermost. The pair of elements (14) is located between the two image planes formed in the telescope and is movable between two conjugate positions.

9 Claims, 1 Drawing Sheet

ZOOM LENS

Zoom lenses are commonly used in conjunction with other optical elements to provide variable magnification at, for example, infra-red optical wavelengths If used with an appropriate objective and an eyepiece, a telescope is formed. Zoom lenses tend to be fairly complex, commonly requiring four or more elements, one or more of which may be movable. Such a lens has the disadvantage of cost and weight.

It is an object of the invention to provide a simple zoom lens for use at infra-red wavelengths and for monochromatic light within the visible spectrum.

According to the present invention there is provided a zoom lens for use in a telescope and providing a magnification which is adjustable to either of two predetermined values and comprising a pair of positive lens elements fixed relative to one another and each having an aspheric surface, the pair of lens elements being locatable between the two image planes formed in the telescope and being movable between two conjugate positions of said image planes.

Figure 1:
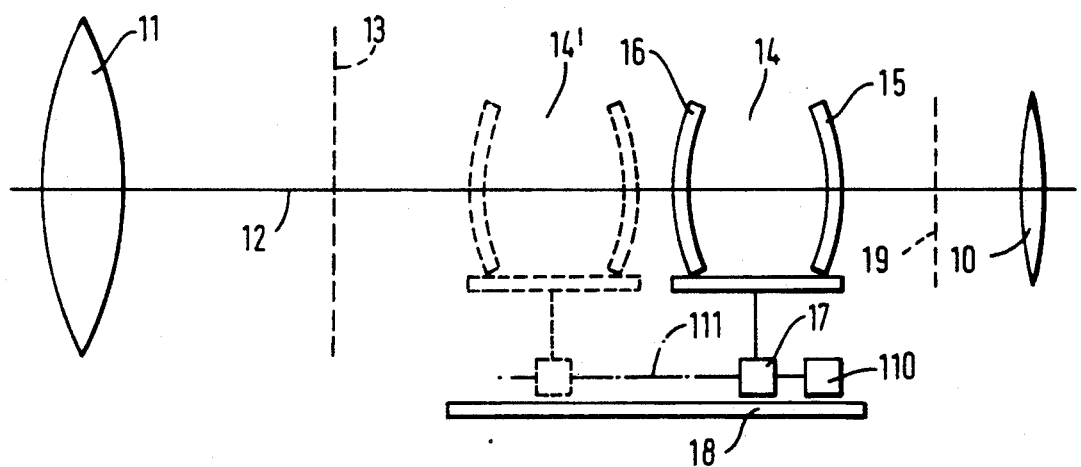
Figure 2:
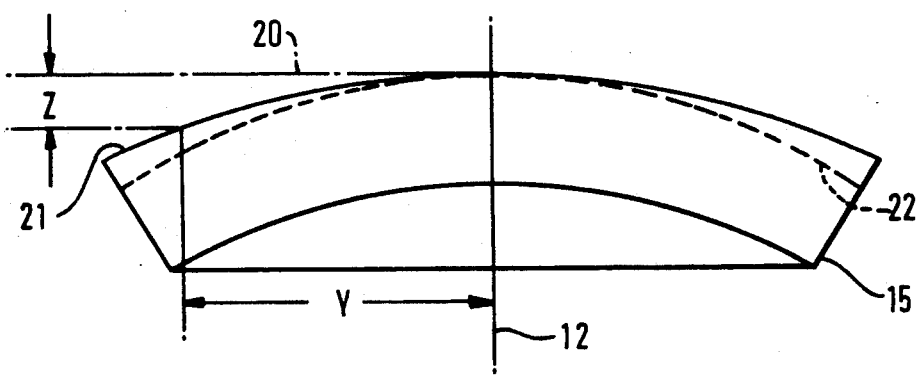

The invention will now be described with reference to the accompanying drawings, in which:

FIG. 1 is a schematic diagram of a simple form of a telescope incorporating the invention; and FIG. 2 is a sectional view of one element of the zoom lens.

Referring now to FIG. 1, in its simplest form, a telescope consists of an eyepiece lens 10 and an objective lens 11 arranged on a common optical axis 12. Between the image plane of the objective lens 11, shown schematically at 13, and the eyepiece lens 10 is located a pair of elements forming the zoom lens assembly 14, also on the optical axis 12. The assembly 14 comprises a pair of similar lens elements 15 and 16 each having one convex surface and one concave surface. The two concave surfaces face one another and the two convex surfaces are outermost. The two convex surfaces are aspheric as will be described later.

The lens elements 15 and 16 are mounted on a carriage, shown schematically at 17, which is movable parallel to the optical axis 12 along a track or guide 18 between two conjugate positions, shown in full and broken outline respectively. In either position, the zoom lens forms an image of the objective image at 13 in a second image plane 19. The carriage 17 is movable by means such as a motor 110 driving a lead-screw 111. Fine adjustment of the position of the carriage 17 is used for focusing purposes.

As state above, the outermost surfaces of lens elements 15 and 16 are aspheric. FIG. 2 shows a section through the center of one of the lens elements. The shape of the outer surface 22 along a radius from the optical axis 12 is defined by the distance Z from the lens surface to a tangent 20, related to radial distance y from the optical axis. The relationship may be expressed as the series:

$$Z = \frac{cy^2}{1 + [1 - (1 + k)c^2 y^2]} + a_4 y^4 + a_6 y^6 + \ldots$$

where c=base curvature (=1/base radius of curvature) and k=conic constant

For example, $0 < k < -1$ denotes an ellipsoid.

As will be seen from FIG. 2, the aspheric surface 22 is formed by reducing the dimension Z over its value for the base spherical surface shown at 21. This reduces the spherical aberration which would otherwise be induced by the steeply curved surface. The concave or inner surface of the lens element may be spherical.

Because the described zoom lens is intended for use at infra-red wavelengths, normal optical glass materials are not suitable. Germanium is commonly used for wavelengths between 8 and 12 $\mu$m. Other materials are or may become, suitable for use at these and other wavelengths between 1 and 14 $\mu$m. In the visible spectrum, the zoom lens of the present invention is suitable only for use with monochromatic light.

The arrangement for moving the zoom lens have not been described in detail as many different arrangements may be used. The zoom lens is not usable at positions intermediate the conjugate positions to give continuously-variable magnification. Whilst the range of magnification depends upon many factors, the majority of these affect the overall dimensions of the telescope with which the zoom lens is used. A range of at least 4:1 is possible with the zoom lens described.

As the lens is made of Germanium, variation of focus with wavelength is very small in the 8-12 $\mu$m range and it is not necessary to provide any form of color correction such as would be necessary for the visible spectrum.

It will be appreciated that the lens elements 15 and 16 need only be positive elements. Thus, plano-convex or other positive elements could be used. Concavo-convex elements such as the elements 15, 16 have advantages of lesser weight and lesser aberrations than other forms of positive lens elements and hence are preferred.

In particular, the air gap between the two concave surfaces acts as a "negative air lens" which, as is well known, allows correction of field curvature in the manner of a Double Gauss Lens. However, the Double Gauss Lens normally requires between 4 and 8 elements when designed for use at multiple wavelengths within the visible and near-infrared regions of the spectrum, using glass elements.

As already stated the main advantages of the zoom lens forming the subject of the invention are the savings in weight and cost over those of known zoom lens arrangements. In addition, optical losses are also reduced.

We claim:

1. A zoom lens for use in an infra-red telescope and providing a magnification which is adjustable to either of two predetermined values and comprising a pair of positive lens elements fixed relative to one another and each having an aspheric surface, the pair of lens elements being locatable between the two image planes formed in the telescope and being movable between two conjugate positions.

2. A lens as claimed in claim 1 wherein the lens elements are arranged with the aspheric surfaces outermost.

3. A lens as claimed in claim 1 wherein the positive lens elements are concavo-convex elements with the concave surfaces facing.

4. A lens as claimed in claim 1 in which the innermost surfaces of the pair of lens elements are spherical.

5. A lens as claimed in claim 1 wherein the positive lens elements are identical.

6. A lens as claimed in claim 1 in which the lens elements are made of a material transmissive of radiation in the range from 1 to 14 $\mu$m.

7. A lens as claimed in claim 6 in which the lens elements are made of a material transmissive of radiation in the range from 8 to 12 μm.

8. A lens as claimed in claim 7 in which the material is germanium.

9. A lens as claimed in claim 1 in which the pair of lens elements are mounted on a carriage for movement parallel to the optical axis of the telescope.

* * * * *

UNITED STATES PATENT AND TRADEMARK OFFICE
CERTIFICATE OF CORRECTION

PATENT NO. : 5,151,820
DATED : September 29, 1992
INVENTOR(S) : Hilary G. SILLITTO ET AL.

It is certified that error appears in the above-indentified patent and that said Letters Patent is hereby corrected as shown below:

In Column 1, line 54, please change "22" to -- 21 --;

-- 21 --.  in the penultimate line, please change "22" to -- 21 --.

In Column 2, line 1, please change "21" to -- 22 --.

Signed and Sealed this

Thirty-first Day of May, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,151,820
DATED : September 29, 1992
INVENTOR(S) : Hilary G. SILLITTO ET AL.

It is certified that error appears in the above-indentified patent and that said Letters Patent is hereby corrected as shown below:

In Column 1, please change the equation at lines 60 and 61 to $$-- \quad Z = \frac{cy^2}{1+[1-(1+k)c^2y^2]^{1/2}} + a_4y^4 + a_6y^6 + \ldots\ldots \quad --.$$

Signed and Sealed this

Fifth Day of March, 1996

Attest:

BRUCE LEHMAN

*Attesting Officer*     Commissioner of Patents and Trademarks